US006558619B1

(12) United States Patent
Walker et al.

(10) Patent No.: US 6,558,619 B1
(45) Date of Patent: May 6, 2003

(54) HIGH PERFORMANCE PHOSPHORUS-CONTAINING CORROSION INHIBITORS FOR INHIBITING CORROSION DRILLING SYSTEM FLUIDS

(75) Inventors: Michael L. Walker, Sugar Land, TX (US); David J. Poelker, Missouri City, TX (US); Rich Lloyd Martin, Pinehurst, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/370,414

(22) Filed: Aug. 9, 1999

(51) Int. Cl.$^7$ ................................................ C23F 11/04
(52) U.S. Cl. ...................... 422/12; 252/181; 252/389.2; 252/389.21
(58) Field of Search ...................... 422/15, 12; 252/175, 252/181, 387, 389.2, 389.21, 389.22, 389.23, 389.24

(56) References Cited

U.S. PATENT DOCUMENTS 3,130,798 A    4/1964  Schramm et al. ............. 175/69
3,487,018 A  * 12/1969  Troscinski
3,580,855 A  *  5/1971  Mickus et al.
3,751,372 A  *  8/1973  Zecher ...................... 422/15 X
3,931,038 A  *  1/1976  Mochi-Bartolani et al. ... 422/13 X
4,172,032 A  * 10/1979  Farley ....................... 422/15 X
4,311,662 A     1/1982  Bellos ......................... 422/12
4,913,822 A  *  4/1990  Chen et al. ................ 422/15 X

FOREIGN PATENT DOCUMENTS

CA           1174451 A  *  8/1984

\* cited by examiner

*Primary Examiner*—Elizabeth McKane
(74) *Attorney, Agent, or Firm*—Madan, Mossman & Sriram, P.C.

(57) ABSTRACT

A corrosion inhibitor comprising a quantity of a phosphorylated oxyalkylated polyol at a pH of 5.0 or higher which produces a first level of corrosion loss in an oxygenated corrosive system under given conditions, and an amount of a passivating agent effective to decrease the corrosion loss under said given conditions to a second level which is less than the first level. The passivating agent minimizes the impact of the corrosion inhibitor on the rheology of drilling system fluids.

30 Claims, No Drawings

HIGH PERFORMANCE PHOSPHORUS-CONTAINING CORROSION INHIBITORS FOR INHIBITING CORROSION DRILLING SYSTEM FLUIDS

FIELD OF THE INVENTION

The present invention relates to phosphorus-containing corrosion inhibitors which are both effective to prevent corrosion by drilling system fluids and which do not adversely affect rheology and stability of the fluids.

BACKGROUND OF THE INVENTION

Two predominant methods are used to drill gas, oil, and subterranean exploration holes in the earth's surface using a rotating bit that grinds away at the subterranean formations. In a first method, a liquid or a mud slurry is used as a vehicle to bring the cuttings from these subterranean formations to the surface and out of the path of the rotating bit. The rotating bit is forced downward by the weight of a drilling pipe. A drilling apparatus is placed over the drilling location; a hole is drilled to a depth; and, a casing of steel is cemented into position to serve as a conduit for lowering the rotating bit and drilling pipe. Various safety devices are attached to the cement casing to direct the flow of any gas, oil, or water encountered during drilling away from the drilling rig.

A second method is "mist" or air drilling, which is described in U.S. Pat. No. 3,130,798, incorporated herein by reference. In "mist" or "air" drilling, air is blown down the hollow drilling tube where the air exits through the drill bit, blowing away the cuttings produced by the drilling. During the course of air drilling, as during any type of drilling, subterranean water may be encountered. When this happens, the subterranean water flows up the drilled hole and out a pipe that is attached to steel casing set at the surface of the hole. This pipe, called a "blooey" line, allows the drill cuttings to travel up the drilled vertical hole where they exit at the surface beneath the rotary drilling table and out a horizontally mounted tube. The tube directs the cuttings, formation water, gas, oil, etc., into a pit dug for safety some thirty or forty feet from the drilling apparatus.

Unless the exiting water is gushing sufficiently to flow from the hole, the subterranean water tends to plug the drill bit and stop the normal flow of solids from the hole. Because of this, the water and/or oil is removed from the hole in order to maintain the normal flow of solids from the hole. During intrusions of water and/or oil, a chemical "foaming" agent typically is injected into the hole. If the formation has a tendency to collapse while being drilled, as in the case of shale, a "conditioner" may be added to prevent collapse of the formation. A common conditioner is a KCl solution (3–10%), which retards swelling of the sensitive formation. The air passing through the foaming agent creates a lathery, multifunctional foam in the hole which helps to remove the subterranean water, rock bits, and cuttings during drilling. The use of water and/or a foaming agent is called "mist" drilling-the chips, etc. exit the hole blown from the depth as a "foamy mist."

Air drilling presents a very corrosive environment for the drilling pipe as it travels up the outside of the tubing with an abundance of air. Although water and air alone are immensely corrosive, the presence of the foaming agent and brine or salts dissolving from the formation as well as the presence of produced gases $CO_2$ and $H_2S$, create an environment that—if left unchecked—may quickly destroy a very expensive drill string of 5–20,000 feet.

Certain phosphorus-containing materials are known to prevent corrosion of the drill string in such an environment. U. S. Pat. No. 4,311,662, incorporated herein by reference, describes phosphorylated oxyalkylated polyols that are very effective as corrosion inhibitors in highly oxygenated systems, such as air drilling systems. These corrosion inhibitors not only inhibit general or overall corrosion but also inhibit localized corrosion of the pitting type.

In order to be useful, a phosphorus-containing inhibitor should be soluble in the fluid, and should not impair properties of the fluid which are important to effective functioning of the fluid. Unfortunately, phosphorus-containing corrosion inhibitors tend to adsorb onto the surface of the drill solids. This has an adverse impact on the rheology and stability of the fluid. Attempts to prevent adsorption of the phosphorus-containing inhibitors onto the drill solids have led to a reduction in corrosion inhibition properties.

Phosphorus-containing corrosion inhibitors are needed which are both effective as corrosion inhibitors and which do not adversely impact the properties of the drilling fluid

SUMMARY OF THE INVENTION

The present invention provides a corrosion inhibitor comprising a quantity of a phosphorylated oxyalkylated polyol at a pH of 5.0 or higher the quantity being effective to produce a first level of corrosion loss from ferrous alloys in contact with an oxygenated corrosive system under given conditions. The corrosion inhibitor also comprises an amount of a passivating agent which is effective to decrease the level of corrosion loss from the ferrous alloys in contact with the oxygenated corrosive system under the given conditions to a second, reduced level of corrosion loss.

DETAILED DESCRIPTION OF THE INVENTION

The present invention provides phosphorus-containing corrosion inhibitors, preferably phosphorylated oxyalkylated polyols, which contain a passivating agent which both enhances the effectiveness of the polyols as corrosion inhibitors, and which does not adversely impact the properties of the drilling fluids in which the inhibitors are used. In a preferred embodiment, the corrosion inhibitor also contains an organophosphate, which further enhances corrosion inhibition.

The phosphorylated oxyalkylated polyols of a preferred embodiment of the invention (described in U.S. Pat. No. 4,311,662, incorporated herein by reference) have the following general structure:

wherein R is an organic moeity, preferably a hydrocarbon moiety, most preferably an alkyl group having from about 2 to about 6 carbon atoms, AO is an oxyalkylene moiety derived from an alkylene oxide, wherein the alkylene preferably has from about 2 to about 6 carbon atoms, n is the number of oxyalkylene units, and x represents the total number of units containing OH groups. Suitable oxyalkylene moieties (AO) include but are not necessarily limited to ethylene oxide, propylene oxide, butylene oxide, etc., and mixtures or block units thereof Preferred polyols include, but are not necessarily limited to glycerol, polyglycerol, trimethanolethane, pentaerythritol, dipentaerithrytol, etc., mannitol, 1, 2, 3 hexanetriol, and similar plyols.

A number of processes are known in the art for preparing phosphorylated polyols. A preferred process is to react a polyphosphoric acid with a polyol. The polyphosphoric acid has a $P_2O_5$(phosphorus pentoxide) content of at least about 72%, preferably from about 82% to about 84%. A residue of orthophosphoric acid and polyphosphoric acid remains on completion of the reaction. This residue may be as high as about 25% to about 40% of the total weight of the phosphorylated polyol. The residue either may be removed or left mixed with the phosphorylated polyol. Preferably the phosphorylated polyols are prepared employing amounts of a polyphosphoric acid having about 0.5 to about 1 molar equivalents of $P_2O_5$ for each equivalent of the polyol used. Larger amounts of polyphosphoric acid can be used, if desired.

By "equivalent of the polyol" is meant the hydroxyl equivalents of the polyol. For example, one mole of glycerol is three "equivalents" of the polyol, one mole of pentaerythritol is four "equivalents" of the polyol, and so forth. The phosphorylated polyols (acid esters) can be partially or completely converted to their corresponding alkali metal salts or ammonium salts by reacting with appropriate basic material.

The compositions are polyfunctional acid phosphate esters of polyhydric alcohols, said esters having the formula $R(OPO_3H_2)_x$ wherein R is the hydrocarbyl group of a polyhydric alcohol (i.e., R is any remaining organic residue of a polyhydric alcohol used as the starting material) and x is a number from 2 to 6, said esters often being referred to in the art as phosphorylated polyols.

Also included within the definition of polyol are amine-containing polyols, including but not necessarily limited to polyols of the general formula above where R is amino-containing. Examples include but are not necessarily limited to tris(hydroxymethyl) aminomethane, 2-amino-2ethyl-1,3-propanediol, triethanolarine, diethanolamine, etc. A detailed method for making the phosphorylated oxyalkylated polyols is described in U.S. Pat. No. 4,311,662, which has been incorporated herein by reference.

According to the present invention, the phosphorylated oxyalkylated polyols are used in combination with a passivating agent. The combination of the passivating agent and the phosphorylated oxyalkylated polyols achieves a higher level of corrosion inhibition than would be achieved under similar conditions using a given amount of the phosphorylated oxyalkylated polyols without the passivating agent. In a preferred embodiment, the passivating agent is used in an amount that—when compared to the corrosion loss experienced using the same polyol in the absence of the passivating agent—reduces corrosion loss in mils per year (mpy) by at least about 5%, preferably by at least about 10%, most preferably by at least about 20%.

The passivating agent preferably is an inorganic salt. Suitable inorganic salts include, but are not necessarily limited to phosphates, nitrates, nitrites, aluminates, silicates, peroxides, borates, perborates, molybdates, tungstates, and the like. Tests were conducted using several of these salts in combination with a phosphorylated oxyalkylated polyol corrosion inhibitor which is commercially available from Baker Petrolite Company under the name "KD-40." In tests using a combination of "KD-40" and 5 wt % of either sodium molybdate, sodium nitrite, or a combination thereof, no significant enhancement of corrosion inhibition was observed at a relatively low level of only about 90 ppm of the combined solution. At an intermediate level of about 225 ppm of the combined solution, about 20% or more enhancement of corrosion inhibition was observed. At a relatively high level of about 450 ppm of the combined solution, the amount of polyol present apparently was so high that the passivating agent did not exhibit a significant enhancement of corrosion inhibition. Thus, it appears that the passivating agent is preferably used in combination with about 90 to about 400 ppm, preferably about 225 ppm, of the corrosion inhibitor. In preferred embodiments, the passivating agent enhances corrosion inhibition by a given inhibitor by about 5% or more, preferably by about 10% or more, most preferably by about 20% or more.

In a preferred embodiment, the phosphorylated oxyalkylated polyol is used in combination with both a passivating agent and from about 0.5 wt % to about 25 wt %, preferably about 20 wt % of an organophospate. The organophosphate further enhances the corrosion inhibiting effectiveness of the phosphorylated oxyalkylated polyol. A number of suitable organophosphates may be used, with preferred organophosphates being phosphorylated polyethylene imines of from about 2 to about 10 units.

In a most preferred embodiment, the corrosion inhibitor comprises from about 50 wt % to about 90 wt % KD-40, from about 20 wt % of an organophosphate comprising a phosphorylated polyethylene imine of 2 to 10 units, and about 5 wt % to about 15 wt % of a substantially equimolar combination of sodium molybdate and sodium nitrite.

The invention will be better understood with reference to the following examples, which are illustrative only, and should not be construed as limiting the invention to a particular embodiment.

EXAMPLE I

KD-40 was obtained from Baker Petrolite Company. Sample "187-1" was prepared by adding 5.0% w/w sodium molybdate to KD-40. Sample 187-2 was prepared by adding 5.0% w/w sodium nitrite to KD-40. Sample 187-3 was made by mixing equal volumes of 187-1 and 187-2.

A vertical column was used to simulate a drilling pipe in these experiments. The vertical column had a lower end comprising an air jet tube and a fluid injection port and a top end comprising a perpendicular exit tube connected to a rubber tube, which was directed into a disposal sump. The test fluid was 1% KCI saturated air containing the amount of corrosion inhibitor indicated in the Table below. The test fluid was introduced through the fluid injection port to cover the sample and stirred at room temperature. Mounted in the bottom of the vertical column was a 1020 mild steel (AISI) probe of an electrochemical corrosion meter with test fluid. The corrosion meter is described in U.S. Pat. No. 3,406,101, and is manufactured and sold by Baker Petrolite under the name "PAIR," an abbreviation for "Polarization Admittance Instantaneous Rate." The corrosion meter accurately measured corrosion rate of a 1020 mild steel (AISI) probe in mils per year (mpy). The lower the measured value in mpy, the better the compound performed as a corrosion inhibitor. The results are given below:

| Inhibitor | Inhibitor Concentration (ppm) | Corrosion Loss (weighted average, mpy) | Corrosion Loss (Final average, mpy) |
| --- | --- | --- | --- |
| None | — | 57 | 50 |
| KD-40 | 90 | 60 | 50 |
| 187-1 (KD-40) | 90 | 56 | 80 |
| 187-2 (KD-40) | 90 | 43 | 50 |
| 187-3 (KD-40) | 90 | 45 | 40 |
| KD-40 | 225 | 27 | 19 |
| 187-1 | 225 | 21 | 13 |

-continued

| Inhibitor | Inhibitor Concentration (ppm) | Corrosion Loss (weighted average, mpy) | Corrosion Loss (Final average, mpy) |
|---|---|---|---|
| 187-2 | 225 | 21 | 15 |
| 187-3 | 225 | 18 | 10 |
| KD-40 | 450 | 13 | 6.5 |
| 187-1 | 450 | 15 | 8.5 |
| 187-2 | 450 | 13 | 7.5 |

Significant improvement in corrosion inhibition was seen using the inhibitor at an intermediate level of about 225 ppm.

Persons of ordinary skill in the art will appreciate that many modifications may be made to the embodiments described herein without departing from the spirit of the present invention. Accordingly, the embodiments described herein are illustrative only and are not intended to limit the scope of the present invention.

We claim:

1. A method comprising adding to an oxygenated corrosive drilling fluid system a quantity of a corrosion inhibitor comprising:
   a phosphorylated oxyalkylated polyol at a pH of 5.0 or higher, said quantity being effective to produce a first level of corrosion loss from ferrous alloys in contact with said corrosive oxygenated system under given conditions; and
   an amount of a passivating agent effective under said given conditions to decrease said first level of corrosion loss to a second level of corrosion loss which is less than said first level of corrosion loss.

2. The method of claim 1 wherein:
   said quantity is from about 90 ppm to about 400 ppm; and
   said amount is about 5 wt % or more of the phosphorylated oxyalkylated polyol.

3. The method of claim 2 wherein said quantity is from about 130 to about 300 ppm.

4. The method of claim 3 wherein said phosphorylated oxyalkylated polyol has a pH of from about 6.0 to about 8.5.

5. The method of claim 3 wherein said phosphorylated oxyalkylated polyol is an oxyethylated polyol.

6. The method of claim 3 wherein said passivating agent is inorganic salt.

7. The method of claim 3 wherein said corrosion inhibitor further comprises an organophosphate effective to further decrease said corrosion loss from said second level to a third level which is less than said second level.

8. The method of claim 3 wherein said passivating agent is an inorganic salt selected from the group consisting of a phosphate, a nitrate, a nitrite, an alum inate, a silicate, a peroxide, a borate, a perborate, a molybdate, and a tungstate, and combinations thereof.

9. The method of claim 2 wherein said phosphorylated oxyalkylated polyol has a pH of from about 6.0 to about 8.5.

10. The method of claim 2 wherein said phosphorylated oxyalkylated polyol is an oxyethylated polyol.

11. The method of claim 10 wherein said passivating agent is inorganic salt.

12. The method of claim 11 wherein said corrosion inhibitor further comprises an organophosphate effective to further decrease said corrosion loss from said second level to a third level which is less than said second level.

13. The method of claim 12 wherein said passivating agent is an inorganic salt selected from the group consisting of a phosphate, a nitrate, a nitrite, an aluminate, a silicate, a peroxide, a borate, a perborate, a molybdate, a tungstate, and combinations thereof.

14. The method of claim 11 wherein said passivating agent is an inorganic salt selected from the group consisting of a phosphate, a nitrate, a nitrite, an aluminate, a silicate, a peroxide, a borate, a perborate, a molybdate, a tungstate, and combinations thereof.

15. The method of claim 10 wherein said passivating agent is an inorganic salt selected from the group consisting of a phosphate, a nitrate, a nitrite, an aluminate, a silicate, a peroxide, a borate, a perborate, a molybdate, and a tungstate, and combinations thereof.

16. The method of claim 10 wherein said corrosion inhibitor further comprises an organophosphate effective to further decrease said corrosion loss from said second level to a third level which is less than said second level.

17. The method of claim 2 wherein said phosphorylated oxyalkylated polyol is selected from the group consisting of glycerol, pentaerythritol, trimethylol propane, and a salt of said phosphorylated oxyalkylated polyoi selected from the group consisting of an alkali metal salt, an ammonium salt, and an amine salt thereof.

18. The method of claim 2 wherein said passivating agent is an inorganic salt.

19. The method of claim 2 wherein said corrosion inhibitor further comprises an organophosphate effective to further decrease said corrosion loss from said second level to a third level which is less than said second level.

20. The method of claim 2 wherein said passivating agent is an selected from the group consisting of a phosphate, a nitrate, a nitrite, an aluminate, a silicate, a peroxide, a borate, a perborate, a molybdate, a tungstate, and combinations thereof.

21. The method of claim 1 wherein said phosphorylated oxyalkylated polyol has a pH of from about 6.0 to about 8.5.

22. The method of claim 21 wherein said second level is about 90% or less of said first level.

23. The method of claim 1 wherein said phosphorylated oxyalkylated polyol is an oxyethylated polyol.

24. The method of claim 23 wherein said second level is about 90% or less of said first level.

25. The method of claim 1 wherein said passivating agent is an inorganic salt.

26. The method of claim 25 wherein said second level is about 90% or less of said first level.

27. The method of claim 1 wherein said corrosion inhibitor further comprises an organophosphate effective to further decrease said corrosion loss from said second level to a third level which is less than said second level.

28. The method of claim 27 wherein said second level is about 90% or less of said first level.

29. The method of claim 1 wherein said passivating agent is an selected from the group consisting of a phosphate, a nitrate, a nitrite, an aluminate, a silicate, a peroxide, a borate, a perforate, a molybdate, a tungstate, and combinations thereof.

30. The method of claim 1 wherein said second level is about 90% or less of said first level.

* * * * *